US007025935B2

(12) United States Patent
Jones et al.

(10) Patent No.: US 7,025,935 B2

(45) Date of Patent: Apr. 11, 2006

(54) APPARATUS AND METHODS FOR REFORMATTING LIQUID SAMPLES

(75) Inventors: Aaron C. Jones, San Diego, CA (US); Brett C. Ellman, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 214 days.

(21) Appl. No.: 10/412,636

(22) Filed: Apr. 11, 2003

(65) Prior Publication Data

US 2004/0203174 A1 Oct. 14, 2004

(51) Int. Cl.

| | |
|---|---|
| ***B01L 3/02*** | (2006.01) |
| ***G01N 1/10*** | (2006.01) |
| ***G01N 21/00*** | (2006.01) |
| ***G01N 15/06*** | (2006.01) |
| ***G01N 35/00*** | (2006.01) |

(52) U.S. Cl. ...................... 422/100; 422/58; 422/68.1; 436/180; 436/46

(58) Field of Classification Search ................ 422/100, 422/63, 65, 68.1, 58; 436/180

See application file for complete search history.

(56) References Cited

U.S. PATENT DOCUMENTS

| | | | | |
|---|---|---|---|---|
| 5,529,756 | A | 6/1996 | Brennan | |
| 5,807,522 | A | 9/1998 | Brown et al. | |
| 5,976,813 | A | 11/1999 | Beutel et al. | |
| 6,063,339 | A | 5/2000 | Tisone et al. | |
| 6,083,761 | A | 7/2000 | Kedar et al. | |
| 6,102,984 | A | 8/2000 | Carl | |
| 6,143,152 | A | 11/2000 | Simpson et al. | |
| 6,231,739 | B1 * | 5/2001 | Nordman et al. | 204/601 |
| 6,231,813 | B1 * | 5/2001 | Ally et al. | 422/100 |
| 6,350,618 | B1 * | 2/2002 | Borrelli et al. | 436/174 |
| 6,596,237 | B1 * | 7/2003 | Borrelli et al. | 422/100 |
| 6,627,157 | B1 * | 9/2003 | Doktycz et al. | 422/100 |
| 6,762,061 | B1 * | 7/2004 | Borrelli et al. | 436/180 |
| 2002/0006359 | A1 | 1/2002 | Mathies et al. | |
| 2002/0028160 | A1 * | 3/2002 | Xiao et al. | 422/100 |
| 2002/0164824 | A1 * | 11/2002 | Xiao et al. | 436/524 |
| 2003/0124734 | A1 * | 7/2003 | Dannoux | 436/180 |

FOREIGN PATENT DOCUMENTS

| | | |
|---|---|---|
| WO | WO-00/72968 A1 | 12/2000 |
| WO | WO-02/37096 A1 | 5/2002 |
| WO | WO-02-39084 A2 | 5/2002 |
| WO | WO-02/064812 A2 | 8/2002 |

OTHER PUBLICATIONS

Brush, M. "Automated Liquid Handlers Advance," The Scientist, 16[3]:38, (Feb. 4, 2002).

(Continued)

*Primary Examiner*—Jill Warden
*Assistant Examiner*—Brian R. Gordon
(74) *Attorney, Agent, or Firm*—John T. Murphy

(57) ABSTRACT

The invention provides an apparatus and method for transferring a plurality of samples from an array of source sample locations to an array of destination sample locations. An apparatus or method of the invention are useful for reformatting samples in cases where the array of source sample locations differs in shape or orientation from the array of destination sample locations. The invention can be used to transfer fluid samples in the absence of an externally applied force. Because active automation is not required for transferring samples, the invention provides the advantage of a compact and efficient format for liquid handling.

19 Claims, 5 Drawing Sheets

OTHER PUBLICATIONS

Rose, D. "Microfluidic Technologies and Instrumentation for Printing DNA Microarrays," in: Ed. Schena, M., Microarray Biochip Technology (Eaton Publishing, Mar. 2000), Chapter 2.

synQuad technology [online], Genomic Solutions, Cartesian Dispensing Systems [retrieved on Feb. 11, 2003]. Retrieved from the internet: <http:///www.cartesiantech.com/sq_tech.html>.

Hummingbird System [online]. Genomic Solutions, Cartesian Dispensing Systems [retrieved on Feb. 11, 2003], Retrieved from the internet: <http://www.cartesiantech.com/hummingbird_ad.gif>.

* cited by examiner

3A

3B

3C

APPARATUS AND METHODS FOR REFORMATTING LIQUID SAMPLES

BACKGROUND OF THE INVENTION

This invention relates generally to microfluidics, and more specifically to transfer of liquid samples from a set of wells to a substrate surface.

Small sample volumes are desired in many research and development applications directed to identifying new disease markers and bringing to the clinic new diagnostic assays and therapeutic drugs. In order to reap the benefits of sensitive assay systems and to avoid the need for harvesting large biological samples, procedures required to prepare and assay the samples need to be capable of transferring and manipulating small volumes of fluid. In particular, microarray-based technologies are useful for screening a sample against thousands of diagnostic probes or drug candidates. Thus, microarray technology can be used to effectively fractionate a single sample into thousands of assays. Again, transfer and manipulation of small volumes of sample and reagents is desired in order to take full advantage of the sensitivity and throughput of microarray-based systems.

A standard format for preparing, manipulating and storing collections of synthetic and biological molecules is that of a microplate. Microplates contain multiple wells in a plate having a standard size and shape footprint. Accordingly, many robotic systems have been designed specifically for manipulating microplates and the samples they contain. While microplates are useful for several assays, many diagnostic and research applications utilize array formats that differ from microplate formats or that require samples to be aliquoted from a single plate to multiple other formats. Although a variety of automated methods are available for sample transfer, these systems tend to be costly and mechanically complex. The equipment is typically large and, therefore, not conducive to assay miniaturization.

Thus, there exists a need for apparatus and methods to efficiently transfer and reformat liquid samples from microplates to substrate surfaces used in array methodologies. The present invention satisfies this need and provides other advantages as well.

BRIEF SUMMARY OF THE INVENTION

The invention provides a sample transfer apparatus, including a plurality of separate capillary tubes each having an inlet and outlet orifice; and a support member orienting the inlet orifices as a matrix of inlet orifices and the plurality of outlet orifices as a matrix of outlet orifices, wherein the inlet orifices are directed to source sample locations and the outlet orifices are directed to destination sample locations, and wherein the transfer area of the planar matrix of inlet orifices is larger than the transfer area of the planar matrix of outlet orifices.

The invention provides a sample transfer apparatus, including a plurality of separate capillary tubes each having an inlet and outlet orifice; and a support member orienting the inlet orifices as a planar matrix of inlet orifices and the plurality of outlet orifices as a planar matrix of outlet orifices, wherein the planar matrix of inlet orifices is substantially parallel to the planar matrix of outlet orifices, wherein the inlet orifices and the outlet orifices are pointed in opposite directions, and wherein the transfer area of the matrix of inlet orifices is larger than the transfer area of the matrix of outlet orifices.

The invention further provides a method for transferring a plurality of samples from a microplate to a substrate. The method includes the step of providing a microplate having a plurality of samples; contacting simultaneously the plurality of samples with a matrix of inlet orifices of a plurality of separate capillary tubes, whereby the samples are passively drawn through the capillary tubes to a matrix of outlet orifices; contacting sample at the outlet orifices with a substrate, whereby the sample is transferred to the substrate, wherein the transfer area of the matrix of inlet orifices is larger than the transfer area of the matrix of outlet orifices.

DETAILED DESCRIPTION OF THE INVENTION

Figure 1:
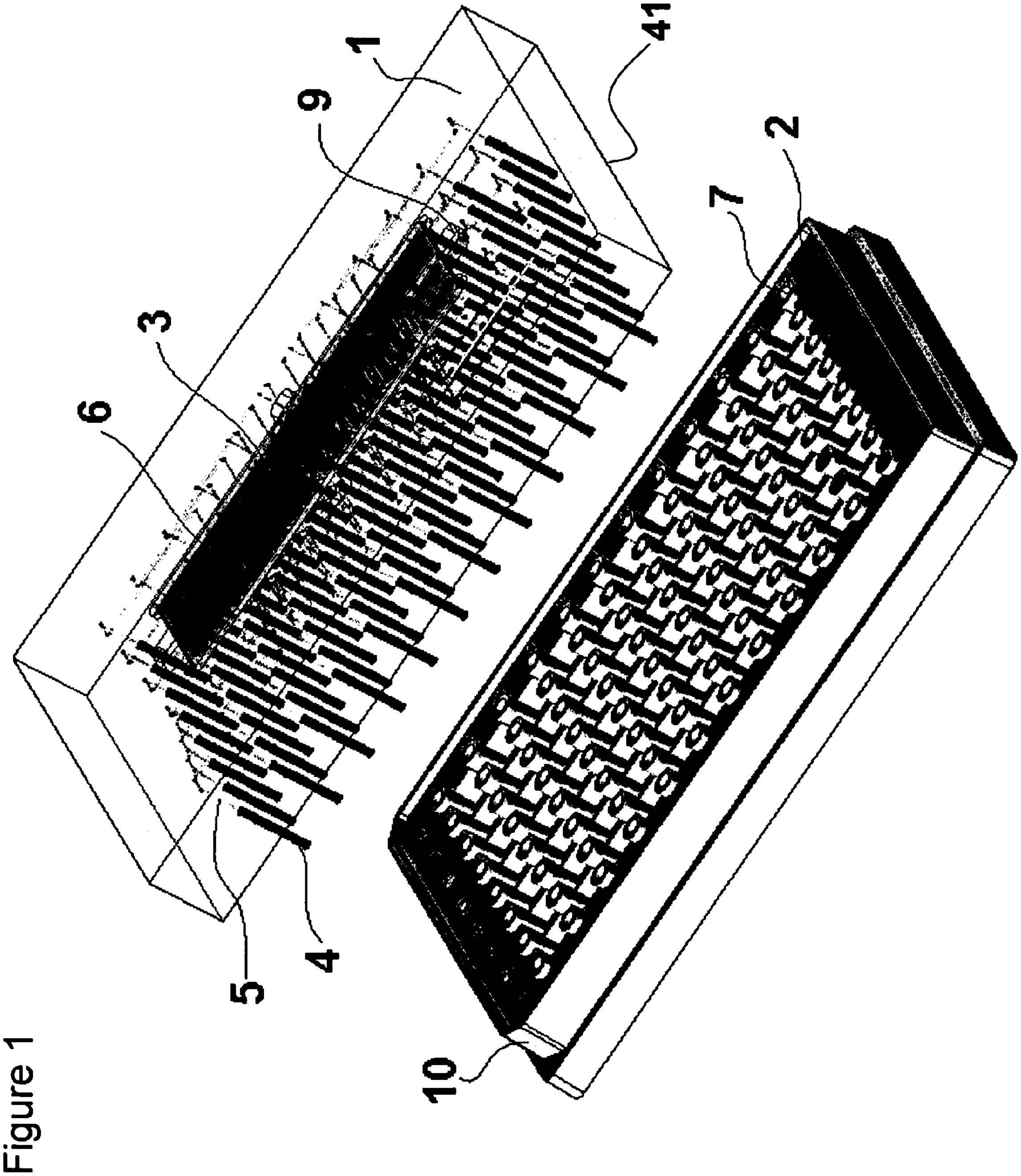
FIG. 1 shows an exemplary apparatus having 96 capillaries with inlet orifices placed to contact samples in the wells of a 96 well microplate and outlet orifices placed to deliver the samples to the surface of a glass slide.

This invention provides an apparatus for transferring a plurality of samples from source locations to destination locations. According to the invention the format of a plurality of samples in the source and destination locations can differ, thereby resulting in reformatting of the plurality of samples. Exemplary formats between which samples can be transferred include, for example, collections of sample vessels, a multi-well plate such as a microplate, substrate such as a glass slide, or array of bead arrays. Reformatting can also result in a change in the size or shape of the area occupied by a plurality of samples. The invention can also be used to transfer samples between locations having similar format, for example, to divide the sample into aliquots, or to move the sample from one reaction condition to another.

An apparatus of the invention does not require active transmission to accomplish sample transfer from one location to another. Rather, samples can be transferred by a passive process such as surface tension effects which draw liquid from a source location through a capillary tube to a destination location. Accordingly, the invention provides a method for transferring a plurality of samples from source locations to destination locations. In particular embodiments, a plurality of samples can be simultaneously transferred from several source locations to several destination locations including, for example, from the wells of a microplate to the surface of a slide. An advantage of the invention is that sample transfer can be achieved in an apparatus having compact format. Compact format can be achieved because the apparatus need not include devices for generating a force to move samples such as pumps, or electrophoresis units typically used in other fluid handling apparatus. However, if desired, an apparatus of the invention can be used to transfer a plurality of liquid samples under the influence of an applied force and such devices can be included in an apparatus of the invention.

As used herein the term "capillary tube" is intended to mean a vessel open at each end and having a cross sectional area small enough that liquid rises in the vessel in the absence of an externally applied force when the vessel is vertical. A capillary tube can be made from any material that is capable of containing a liquid sample. The internal surface of a capillary tube can be hydrophobic or hydrophilic.

As used herein, the term "planar matrix," when used in reference to a plurality of orifices, is intended to mean at least three orifices arranged such that they can simultaneously contact a flat surface. The arrangement can be, for example, a line, curve, square or rectangular grid, triangle, circle, set of concentric circles, spiral or combination thereof. Exemplary planar matrices can include a row or column or both with at least 2, 4, 8, 10, 12, 16, 24, 32, or 48 orifices.

As used herein, the term "substantially parallel," when used in reference to two planes, is intended to mean the dihedral angle between the two planes is between 0 and 0.1 degrees.

As used herein, the term "transfer area," when used in reference to a matrix of orifices, is intended to mean the continuous two-dimensional space within which the matrix resides. The transfer area includes the discontinuous two-dimensional space that is occupied by the orifices and, additionally, the two-dimensional space intervening between the orifices, thereby being a continuous two-dimensional space.

As used herein, the term "removably connected" is intended to mean temporary attachment of components to each other such that the integrity of the components is retained upon separation. Exemplary temporary attachments include those mediated by an external or internal fastening device such as a clamp, nail, screw or pin; slotted parts; snap-to fit parts, male/female connector, cartridge, sleeve or the like. Typically, following separation of removably connected components they can be reconnected to form a functional apparatus.

As used herein, the term "vent" is intended to mean an opening that allows gas and liquid to pass between the tip of a capillary tube and a surface that is proximal or in contact with the tip.

As used herein, the term "passively drawn," when used in reference to a liquid, is intended to mean movement of the liquid primarily under the influence of a natural process. Examples of natural processes included in the term are gravity flow and capillary action.

As used herein the term "multi-well plate" is intended to mean a substrate having a plurality of discrete chambers suitable for holding a liquid. A substrate included in the term can be, for example, molded plastic such as polystyrene or polypropylene. Exemplary multi-well plates include, for example, microplates microtiter plates or n-well plates where "n" is the number of wells including, for example, 8-, 16-, 96-, 384-, or 1536-wells. As used herein, the term "microplate" is intended to mean a multi-well plate that has dimensions and properties consistent with the definition provided by the Society for Biomolecular Screening (Danbury, Conn., USA). A multi-well plate can have wells with any of a variety of cross sectional shapes including, for example, cylindrical, square, rectangular, multisided, interlocking shapes wherein the bottom of wells are flat, conical, pointed, or round.

The invention provides a sample transfer apparatus, including a plurality of separate capillary tubes each having an inlet and outlet orifice; and a support member orienting the inlet orifices as a matrix of inlet orifices and the plurality of outlet orifices as a matrix of outlet orifices, wherein the inlet orifices are directed to source sample locations and the outlet orifices are directed to destination sample locations, and wherein the transfer area of the matrix of inlet orifices is larger than the transfer area of the matrix of outlet orifices.

The invention provides a sample transfer apparatus, including a plurality of separate capillary tubes each having an inlet and outlet orifice; and a support member orienting the inlet orifices as a planar matrix of inlet orifices and the plurality of outlet orifices as a planar matrix of outlet orifices, wherein the planar matrix of inlet orifices is substantially parallel to the planar matrix of outlet orifices, wherein the inlet orifices and the outlet orifices are pointed in opposite directions, and wherein the transfer area of the planar matrix of inlet orifices is larger than the transfer area of the planar matrix of outlet orifices.

Figure 2:
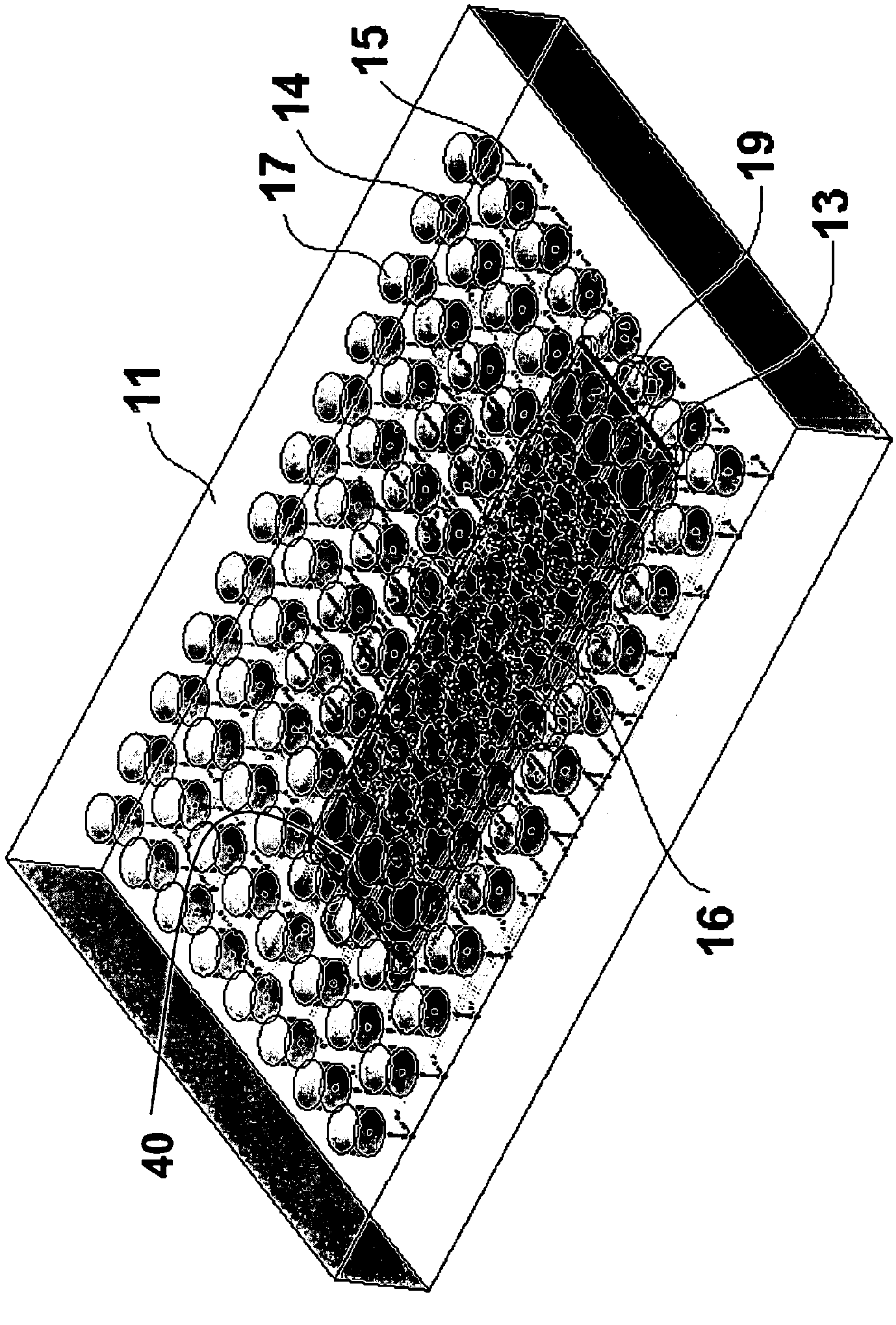
FIG. 2 shows an exemplary apparatus having 96 integrated wells and capillaries placed to deliver samples from the wells to the surface of a glass slide.
Figure 3:
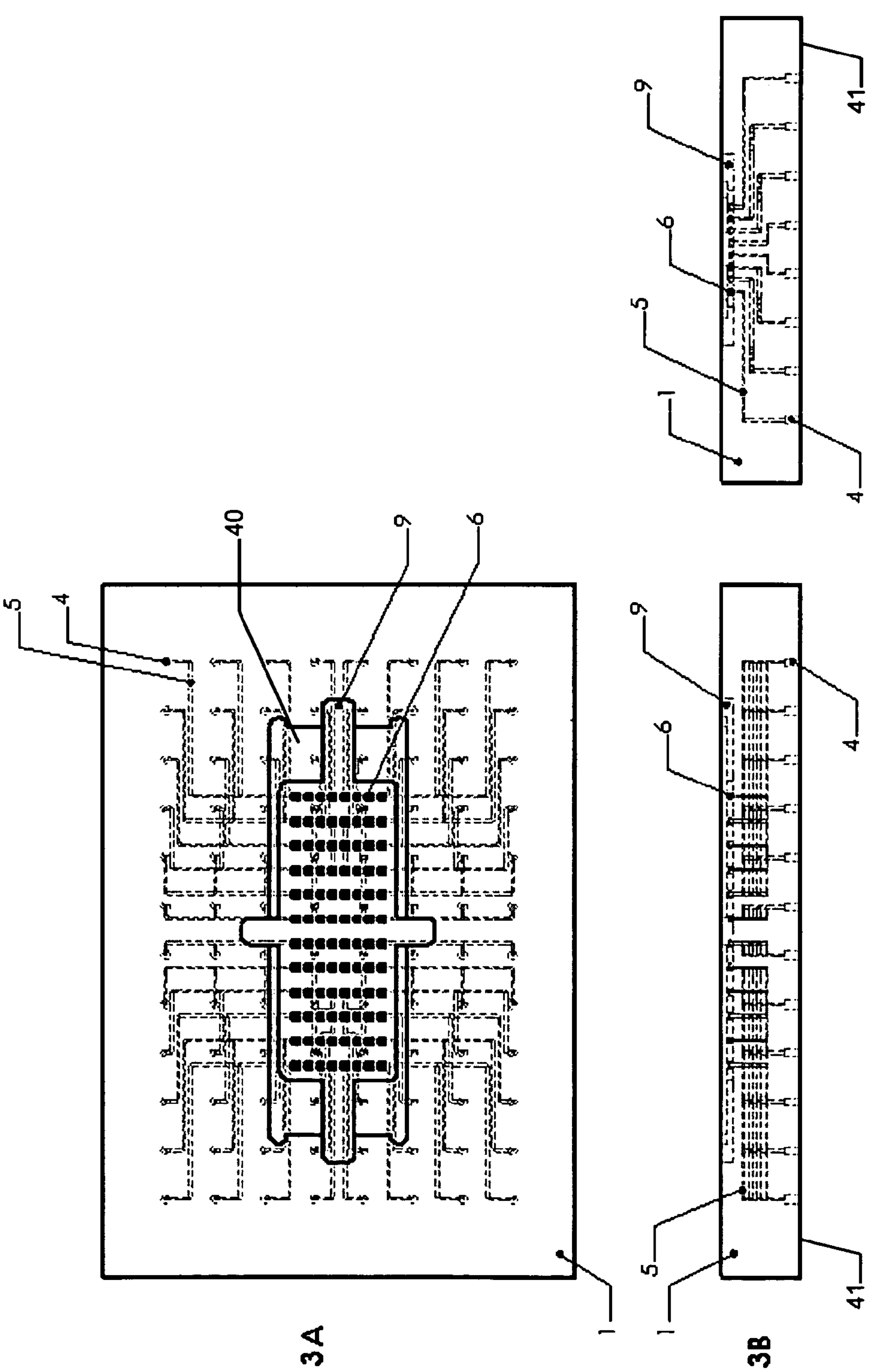
FIG. 3 shows top (panel A) and side (panels B and C) views of the exemplary apparatus shown in FIG. 1.

As shown by the exemplary sample transfer apparatus in FIGS. 1 through 3, a plurality of capillary tubes 5 can be oriented by a polymer support member 1. The inlet orifices 4 of 96 capillary tubes 5 can be arranged to form a planar matrix spaced to come into contact with the interior wells 7 of a 96-well microplate 2. The outlet orifices 6 of the capillary tubes 5 can also be arranged to form a planar matrix which is parallel to the planar matrix of inlet orifices 4. A substrate such as a glass slide 3 can be placed into contact with polymer support 1 such that its lower surface is proximal to the outlet orifices and parallel to the planar matrix of outlet orifices 6. The surface 40 upon which the slide contacts the polymer support can further include a vent 9 such that liquid samples drawn from the wells 7 of the 96-well microplate 2 are deposited as drops on the lower surface of glass slide 3. The capillary tubes 5 can be placed such that the outlet orifices 6 are more closely spaced than the inlet orifices 4, thereby forming a more compact version of the 96 well grid. Thus, liquid samples can be reformatted from a 96-well microplate 2 to the surface of a substrate such as a glass slide 3 using an apparatus of the invention.

A sample transfer apparatus of the invention can include a larger or smaller number of capillaries 5 than exemplified in FIGS. 1 through 3, as desired to suit a particular liquid handling application. In particular, a sample transfer apparatus of the invention can include n capillaries arranged to come into contact with the wells of an n-well microplate, where n is any integer including, but not limited to, 4, 8, 16, 48, 384 or 1536. Those skilled in the art will readily be able to determine an appropriate orientation and spacing for the inlet orifices of a plurality of capillaries used in an apparatus of the invention based on the dimensions of the plurality of wells containing the source sample. In particular embodiments, an apparatus of the invention can have a plurality of inlet orifices placed to contact the interior of the wells of a standard 96-, 384-, or 1536-well microplate. Thus, the transfer area of a matrix of inlet orifices can be, for example, within about 110 $cm^2$, in accordance with the 127.8 mm by 85.5 mm footprint of a standard microplate. The spacing of orifices in a matrix can be configured in accordance with a standard microplate being separated by, for example, about 18 mm on center in accordance with the spacing of wells in a 24 well plate, about 9 mm on center in accordance with the spacing of wells in a 96-well plate, about 4.5 mm on center in accordance with the spacing of wells in a 384-well plate, or about 2.25 mm on center in accordance with the spacing of wells in a 1536-well plate.

As set forth above and demonstrated in FIGS. 1 through 3, a matrix of inlet orifices and matrix of outlet orifices can have similar relative locations such that the latter is a more compact version of the former having, for example, a smaller footprint. Thus, a plurality of samples can be reformatted from a plurality of wells or other source sample locations to a substrate that has a smaller footprint compared to the space occupied by the plurality of wells or other source sample locations. In another embodiment, an apparatus of the invention can have a matrix of outlet orifices that is the same size as the matrix of inlet orifices as exemplified in FIG. 5. Those skilled in the art will recognize that an apparatus of the invention can have a matrix of outlet orifices that is expanded compared to the matrix of inlet orifices, thereby occupying a larger transfer area or having a larger footprint. Another property of orthogonal matrices that can be compared is the aspect ratios. As exemplified in FIG. 1, the aspect ratios for the inlet and outlet orifice planar matrices can be similar. However, if desired to suit a particular reformatting application the aspect ratios of the inlet and outlet matrices can differ. Independent of aspect ratio, the relative locations of outlet orifices or shape of a matrix of outlet orifices can be different compared to the arrangement of inlet orifices or shape of a matrix of inlet orifices, respectively. For example, inlet orifices can be arranged in a grid pattern that couples to a standard microplate and the respective outlet orifices can be arranged in a radial pattern such as a spiral or circle. In one embodiment, samples from a multi-well plate having a grid pattern of sample wells can be transferred to a capillary electrophoresis microplate having samples arranged in a circular pattern.

The planar matrix of inlet orifices can be positioned substantially parallel to the planar matrix of outlet orifices in a sample transfer apparatus of the invention. As shown by the exemplary sample transfer apparatus in FIG. 1, the inlet orifices 4 can be pointed in the opposite direction compared to the direction of the outlet orifices 6. An orientation in which the inlet orifices 4 and outlet orifices 6 are pointed in opposite directions is well suited for transferring a plurality of samples from wells 7 to the surface of a substrate 3. In this orientation, the inlet orifices 4 can be dipped into the wells 7 and liquid drawn through the capillaries 5 by capillary action and deposited on the underside of the substrate 3. The apparatus shown in FIG. 1, when placed on a level surface, will allow samples transferred from the wells 7 to be deposited on the underside of the substrate 3 as hanging drops.

In a further embodiment, an apparatus of the invention can include a plurality of orifices that are configured in an orientation other than the exemplary orientation with planar matrices described above. For example, a plurality of orifices can be arranged in a matrix such that orifices contact a plane sequentially when the matrix is moved relative to the plane. Furthermore, the inlet and outlet matrices need not be coplanar. For example, small volumes of samples can be transferred from a multi-well plate on a level surface to a substrate surface that is oriented at a non-orthogonal angle with respect to the force of gravity, as set forth below. It will be understood that the designation of orifices as inlets or outlets herein is exemplary for purposes of describing various embodiments or for the sake of clarity. However, the invention can be used in embodiments wherein a fluid flows in directions other than those exemplified.

The apparatus exemplified in FIGS. 1 and 3, can be used as an intermediate device for reformatting liquid samples from a removably connected microplate 2 to a substrate 3. The substrate 3 can also be removably connected to the capillary tube support member 1. In another embodiment, a capillary tube support member can include integrated wells permanently positioned in contact with a capillary tube and placed in accordance with SBS standards. An exemplary sample transfer apparatus having a support member 11 with integrated wells 17 and capillary tubes 15 for reformatting to a slide 13 is shown in FIG. 2.

As exemplified by the apparatus shown in FIG. 2, a support member 11 can have integral wells 17 the bottom of which contact inlet orifices 14 of capillary tubes 15. The capillary tubes can follow a path under the wells to a location over the wells where the outlet orifices 16 can come into contact with the lower surface of a substrate such as a glass slide 13. The surface 40 upon which the slide 13 contacts the polymer support 11 can further include a vent 19 allowing liquid samples to be drawn from the wells 17 via capillary action. The samples exiting the outlet orifices 16 can be deposited as drops on the lower surface of substrate 13. The planar matrix of inlet orifices 14 and planar matrix of outlet orifices 16 are parallel in FIGS. 1 through 3. Furthermore, the inlet orifices 14 are pointed in the same direction compared to the direction of the outlet orifices 16. In this orientation, sample from the wells 17 can be drawn through capillaries 15 by a combination of gravity and capillary action and deposited on the underside of the substrate 13, where the sample can be suspended as a hanging drop so long as the substrate 13 is substantially level.

In embodiments of the invention exemplified above the destination substrate is positioned to have a surface of destination locations that is substantially orthogonal to the direction of gravity. Such an orientation is useful, for example, when relatively large samples are transferred to a surface and suspended as hanging drops. However, a substrate need not have a surface that is orthogonal to the direction of gravity, for example, when samples are adhered, absorbed or otherwise contained from flowing when transferred to sample destination locations thereon. Accordingly, a matrix of inlet orifices need not be parallel to a matrix of outlet orifices.

Figure 5:
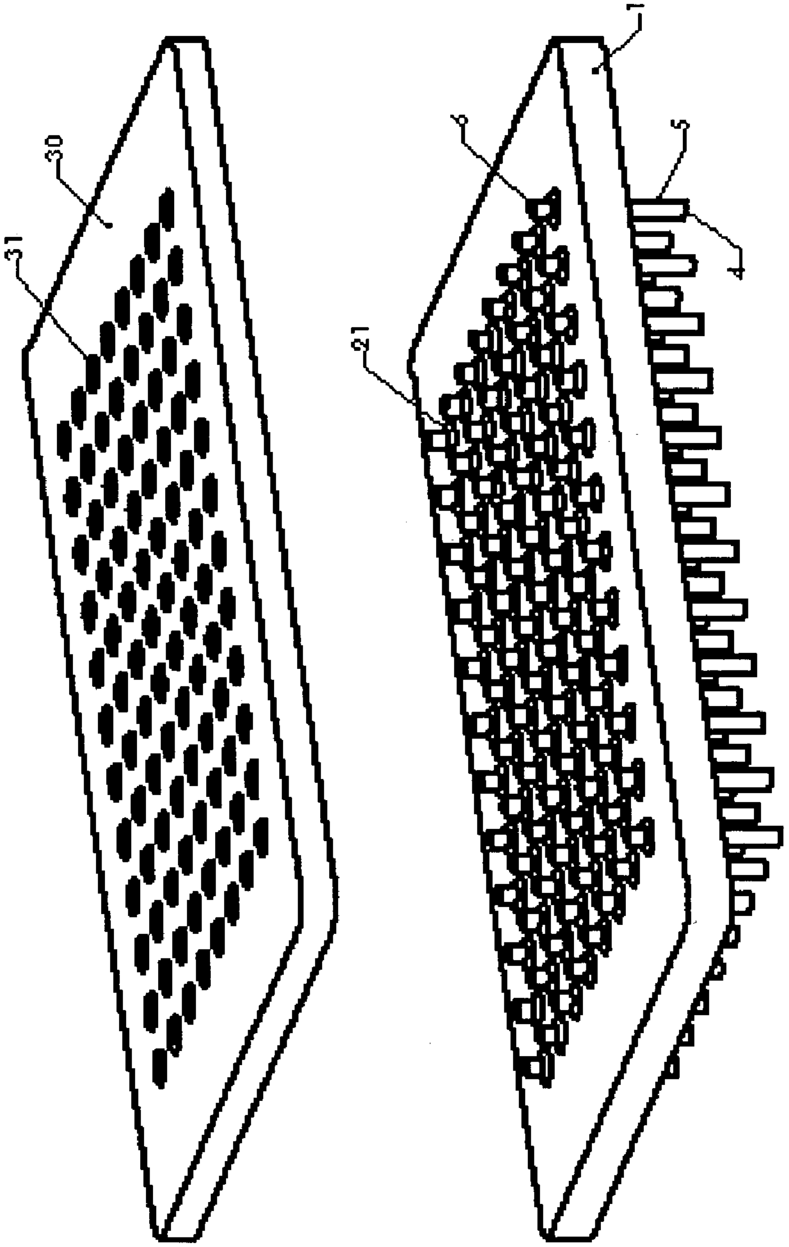
FIG. 5 shows an exemplary apparatus having 96 capillaries with inlet orifices placed to contact samples in the wells of a 96 well microplate and outlet orifices placed to deliver the samples to the surface of an array of bead arrays.

A further exemplary fluid transfer apparatus is shown in FIG. 5. As shown in FIG. 5, an attachment component 21 can be used to connect a matrix of 96 capillary tubes 5 to a polymer support member 1. The attachment component can be a flexible member such as an o-ring made of rubber, TEFLON® or other material that temporarily holds the capillary tubes 5 to the support member 1. Alternatively, attachment of capillary tubes 5 to a support member 1 can be permanent, for example, using glue, adhesive or melting to bond components to each other.

As shown in FIG. 5, rigid capillary tubes 5 can extend beyond a support member 1 and maintain a fixed planar matrix of inlet orifices 4 that is appropriately spaced to come into contact with the interior wells of a 96-well microplate and that is parallel to a planar matrix of outlet orifices 6. Thus, a single plate can be used to orient a plurality of relatively rigid capillary tubes such that both the inlet and outlet orifices of the tubes are maintained in planar matrices. Depending upon the rigidity of the capillary tubes, one or more plates, or other support members, can be incorporated to orient both a matrix of outlet orifices and a matrix of inlet orifices. For tubes made of more flexible materials more extensive support, in particular near the ends of the tubes, may be desirable in order to stably orient the matrices of inlet and outlet orifices. The apparatus shown in FIG. 5 exemplifies an embodiment of the invention in which both the inlet and outlet matrices have similar dimensions overall and the relative locations for the capillary tube orifices in each matrix is the same.

A substrate such as an array of bead arrays 30 can be placed into proximity to the matrix of outlet orifices 6. The surface of the array of bead arrays 30 can be placed at a distance from the outlet orifices 6 that is close enough for transfer of fluid samples from the orifices to each bead array 31. A small gap can be left between the outlet orifices 6 and bead arrays 31 to serve as a vent allowing fluid flow from sample wells to array locations 31 under the influence of capillary action. Exemplary arrays of bead arrays that can be juxtaposed to an apparatus of the invention for sample transfer are described, for example, in U.S. Pat. No. 6,396,995; U.S. patent application Ser. No. 09/606,369 and WO 02/00336.

A capillary tube used in the invention can have one or more properties that allow passive flow of a fluid sample within. Exemplary properties that can be selected to control fluid sample transfer in a capillary tube include, for example, tube length, relative elevation of the inlet and outlet orifices, tube cross-sectional area and tube inner surface composition. The length and path of capillary tubes included in an apparatus of the invention can be chosen in accordance with factors such as the fluid properties of the sample, desired rate of sample transfer, locations of source wells and desired sample destinations. For the exemplary apparatus shown in FIGS. 1 and 2, the capillary tubes have different lengths due, at least in part, to reformatting the array of wells to a smaller area on a glass slide. An apparatus of the invention that reformats an array of samples can also include a plurality of capillary tubes having uniform length. Uniform length capillary tubes are useful for applications in which simultaneous delivery of samples is desired and can normalize the transfer time for a plurality of samples. Those skilled in the art will recognize from the teaching herein that the apparatus shown in FIGS. 1 through 3 can be modified for simultaneous delivery of samples, for example, by twining shorter capillaries such that they have a length equivalent to the longest capillary shown.

The cross-sectional shape of a capillary tube useful in the invention can be any that is capable of supporting capillary flow of a liquid including, for example, cylindrical, elliptical, square, rectangular or multisided. The cross-sectional area of a capillary tube can be selected based on the desired rate of fluid transfer under the conditions of use. Those skilled in the art will know or be able to determine an appropriate capillary tube length, shape and orientation to suit a particular sample composition and set of conditions based on known properties of capillarity as described, for example, in Kundu, "Fluid Mechanics" Academic Press (1990). Typically, a capillary tube of the invention will have a diameter that is sufficiently small to allow a fluid, such as an aqueous sample, to move within by capillary action. Accordingly, a capillary tube can have a cross-sectional area of at most about 5, 1, 0.8, 0.6, 0.4, 0.2, 0.1 or 0.05 $mm^2$. The cross-sectional shape, area or both of a tube used in an apparatus of the invention can be substantially uniform along the length of the tube. In alternative embodiments, the shape or area of a tube can vary along its length.

The cross-sectional diameter or shape of a capillary tube orifice can be similar to the main body of the capillary tube, for example, forming a cylindrical opening. In particular embodiments, differences in size or shape of the orifices compared to the main body of the tube can be incorporated. For example, an outlet orifice can widen to form a funnel shape which supports a drop having a diameter that is larger than the diameter of the capillary tube. Alternatively, a smaller drop can be delivered to a surface by an orifice that tapers in a needle-like fashion to a smaller diameter. In this way, tube diameter can be selected based on fluid transfer considerations such as fluid resistance, rate of fluid transfer and distance of fluid transfer while outlet orifice diameter can be chosen based on the desired spot size or volume of the sample to be transferred.

The movement of a liquid sample in a capillary tube can also be influenced by the interior surface of the tube. Typically, the interior surface of a capillary tube will be compatible with the liquid sample to be transferred such that the liquid sample is attracted into the tube or at least not repelled sufficiently to deter entry of the fluid into the tube. A capillary tube having a hydrophilic interior surface can be used in applications in which an aqueous, polar or hydrophilic liquid sample is to be transferred, thereby favoring flow of the samples through the tube. A capillary tube useful in the invention can have a hydrophilic internal surface due to the presence of a hydrophilic material such as fused silica. Fused silica tubes are useful, for example, in applications in which the tubes are to be bent repeatedly because the external layer provides flexibility while the internal silica layer is hydrophilic. A capillary tube useful in the invention can have a hydrophilic internal surface due to the presence of a coating including, for example, poly(vinylpyrrolidone), poly(vinyl alcohol) (PVA) cross linked with glutaraldehyde, silicone dioxide, acrylic onto which oligomeric analogs (degrees of polymerization of 1, 2 or 3) of monomethoxy polyethylene glycol (PEG) have been grafted, or coatings used in the manufacture of medical devices or capillary electrophoresis devices.

A capillary tube having a hydrophobic interior surface can be used in applications in which an apolar or hydrophobic liquid sample is to be transferred. A capillary tube useful in the invention can have a hydrophobic internal surface due to the presence of a hydrophobic material such as polyvinylchloride (PVC), Polyetheretherketone (PEEK), TYGON® 2075 or 2275, silicone or polytetrafluoroethylene (PTFE, TEFLON®). A capillary tube useful in the invention can have a hydrophobic internal surface due to the presence of a coating including, for example, parylene.

Figure 4:
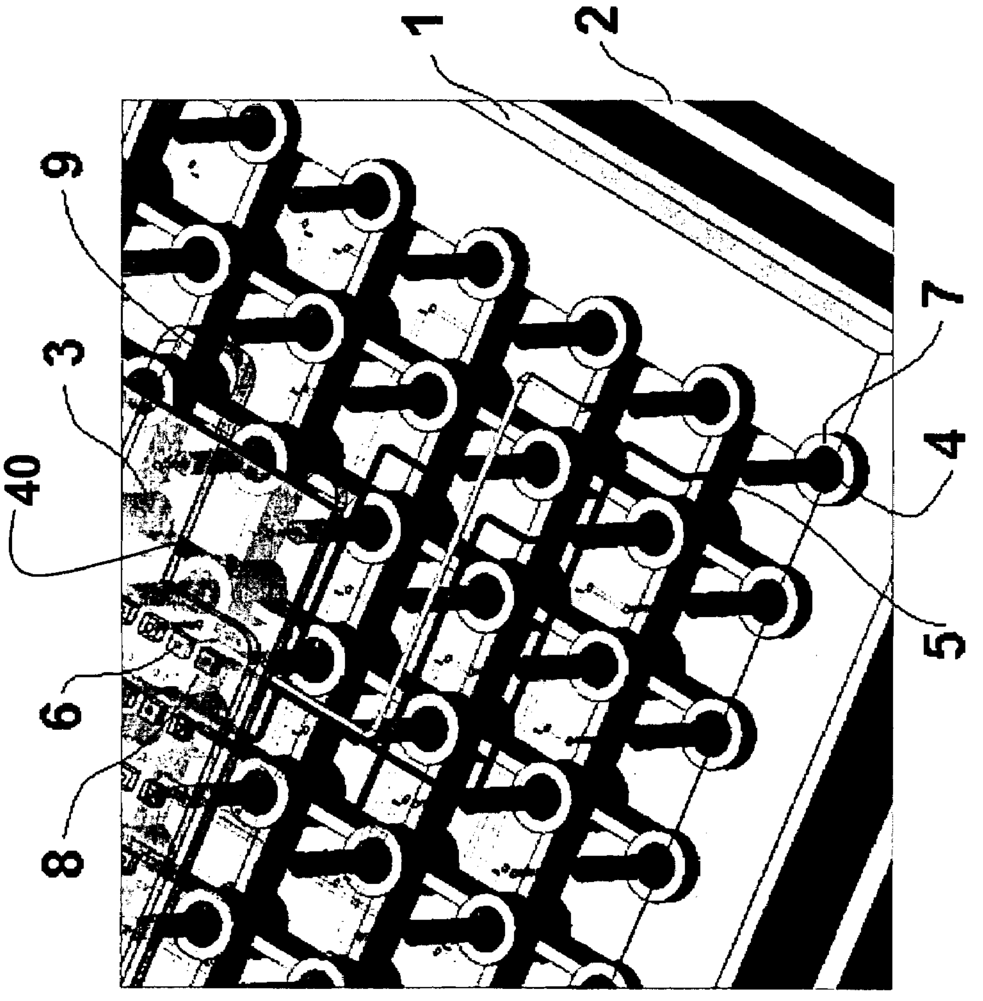
FIG. 4 shows an expanded view of capillaries contacting the wells of a 96 well microplate and surface of a slide.

FIG. 4 shows an expanded view of the exemplary apparatus of FIG. 1 highlighting a subset of outlet orifices 6. In the embodiment shown, each outlet orifice 6 is surrounded by a surface forming an island 8. Each island 8 provides a surface upon which a drop of liquid sample from the capillary tube can form. This drop can, in turn, contact the surface of a substrate 3 when the island 8 and substrate 3 surface are placed in proximity. The size or shape of an island 8 can be selected to produce a drop of different volume for deposition on substrate 3. A relatively small volume of sample can be transferred using an island 8 having a relatively small surface area including, but not limited to, at most about 1, 0.8, 0.6, 0.5, 0.4, 0.2 or 0.1 $mm^2$. Larger volumes can be deposited using, for example, an island 8 having surface area of at least about 10, 20, 30, 40 or 50 $mm^2$.

Although the invention is exemplified herein, for purposes of illustration, with apparatus having capillary tubes, the apparatus can include tubes that do not support substantial movement of a liquid sample by capillary action. For example, tubes having large diameters can be used in conditions where an external force is applied such as the pressure from a pump or vacuum. If desired for a particular application, a tube used in an apparatus of the invention can have an inner surface or region thereof that is incompatible with the liquid to be transferred. For example, in applications including transfer of an aqueous liquid through a tube, the tube can have a hydrophobic inner surface that prevents an aqueous sample from passively entering the tube or passing a particular region of the tube. A surface of a tube that is incompatible with a fluid can be used to prevent movement of the fluid until pressure is applied, thereby effectively forming a valve. Capillary tubes having hydrophobic surfaces that act as valves and methods of using them are described, for example, in Handique et al., *Intl. Workshop Solid-State Sensors and Actuators* (Hilton Head 98) pp. 346–349 (1998) or Wolfhart et al., *Proc. Micro Total Analysis Systems* (μTAS 98) pp. 363–366 (1998). A valve can also be formed in a capillary tube by an abrupt change in internal capillary cross-section as described, for example, in Man et al., *Intl. Conf. Micro Electromechanical Systems* (MEMS 98) pp 45–50 (1997) or Hosokawa et al., *Proc. Micro Total Analysis Systems* (μTAS 98) pp. 307–310 (1998).

In particular embodiments, a capillary tube useful in the invention can have, for example, at most 2 openings. A capillary tube with only 2 openings can be used to transfer a liquid sample from a source location to a single destination location. Alternatively, a capillary tube or other tube used in the invention can have 3 or more openings forming a delta-like structure such that sample from a source location is delivered to 2 or more destination locations. A third opening in a tube of the invention can also be useful for attachment to a pump or vacuum device for moving samples or cleaning the apparatus.

A capillary tube can be a separate tube connected to a support member or can be an internal channel within a solid support member. Embodiments of the invention in which a support member contains integral capillary channels are exemplified in FIGS. 1 through 3. Any of a variety of fastening devices appropriate for connecting a plurality of capillary tubes can be used. FIG. 5 shows an example of an embodiment in which capillary tubes are separate components threaded through holes in a support member.

In a further embodiment of the invention, an apparatus can include a tube having a porous material capable of transferring a liquid by capillary action or wicking. A porous material used in the invention can be one that is inert to one or more solvents or other sample components that are to be transferred. A porous material can be included in a capillary tube or can replace a capillary tube, whereby it will have at least one of the functions or properties of a capillary tube set forth herein. Exemplary porous materials that are useful in the invention include, for example, a porous ceramic, polymer or graphite; sponge; felt; velvet; paper; or string-like wick.

A support member useful in the invention can include any material having sufficient structural properties to orient capillary tubes to form a matrix of inlet orifices and a matrix of outlet orifices. Other properties of a support member material can be considered based upon the intended application. In particular embodiments, a support member can have a property such as a flat surface; resistance to compression; low thermal expansion coefficient; ability to transmit, reflect or absorb light of a particular wavelength region; or resistance to one or more chemical such as an organic solvent, alcohol, hydrocarbon, halogenated hydrocarbon, aromatic solvent, nitrile or the like. Exemplary polymers useful for making a support member include, for example, a polymer such as acrylic, acrylonitrile butadiene styrene (ABS), ULTEM® (Polyetherimide), acetal copolymer, PROPYLUX® HS (heat stabilized polypropylene), RADEL® A (polyethersulfone), RADEL® R (polyarylethersulfone), UDEL® (polysulfone), NORYL® PPO (polyphenylene oxide & styrene), Polycarbonate, UHMW-PE (ultra high molecular weight polyethylene), Polyetheretherketone (PEEK), polyphenylene sulfide (PPS, Techtron or Ryton) or polystyrene; a metal such as aluminum, iron, steel or an alloy; other materials such as glass, fiberglass, silicon, ceramic, or carbon fiber, or derivatives or combinations of these or other suitable materials.

An apparatus of the invention including, for example, those made from materials set forth above, can be fabricated using methods known in the art. Depending upon the material or combination of materials selected, an apparatus of the invention can be fabricated, for example, by machining, photolithography, or casting in a mold. Those skilled in the art will know or be able to determine, for a selected material, machining conditions such as appropriate bits, blades, files, taps, dies and the like as well as operating parameters for each. Similarly, those skilled in the art will know or be able to determine photolithography or casting conditions appropriate to a particular material being fabricated.

An apparatus of the invention can be fabricated by juxtaposing substrate layers that have been machined using methods described above. For example, features that will ultimately be internal to an apparatus can be machined in complementary halves on polymer sheets and the complementary polymer sheets can then be juxtaposed to create the final internal features. Polymer sheets can be juxtaposed, for example, by bonding with diffusion bonding, thermal bonding, ultrasonic welding or an adhesive, clamp, pin, screw or other fastening device. The apparatus shown in FIGS. 1 and 3, for example, can be fabricated with approximately 7 polymer layers bonded together with an adhesive. Tips for internally located tubes such as those in FIGS. 1 and 3 can be an integral machined part of an apparatus of the invention or attached to a support member with pressing, epoxy, or the like.

A sample transfer apparatus of the invention can further include a locating feature that interacts with a complementary locating feature on a microplate or other collection of source sample wells. For example, an apparatus of the invention can include a contact surface 41 placed to orient it with a surface of a microplate such that the inlet orifices come into contact with the interiors of microplate wells. A contact surface 41 can be placed to contact the well-side face of a microplate 2, as exemplified in FIG. 1, where the lower face of support member 1 is placed to contact the upper face of microplate 2 such that the plurality of inlet orifices 4 are placed in contact with a liquid sample in the wells 7 of the microplate 2. An apparatus of the invention can include a plurality of contact surfaces placed to reduce the range of viable orientations for juxtaposing a sample transfer apparatus and microplate, thereby favoring accuracy of placement for inlet orifices into microplate wells. For example, the apparatus shown in FIG. 1 can be modified to include surfaces that are orthogonal to the bottom surface such that they contact sides of the microplate, thereby increasing the accuracy of placement for the matrix of orifices and microplate. Thus, an apparatus of the invention can include at least 2, 3, or 4 surfaces placed to contact complementary surfaces on a microplate.

An apparatus of the invention and microplate can further include locating features that act as complementary male/female fittings that align the components when the fittings are properly mated. For example, the lower surface of the apparatus shown in FIG. 1 can include a flange such that the microplate 2 acts as a male fitting and the apparatus as a female fitting. Typical microplates 2 have at least one chamfered corner 10 that provides an asymmetric shape to the perimeter of the well-side face of the microplate 2. Due to the asymmetry, the location of the chamfer 10 correlates with the relative locations of wells 7 in the microplate 2. A complimentary chamfer can be included in the contact surface 41 of the apparatus such that contact between the inlet orifices 4 and the interiors of microplate wells 7 is prevented unless the apparatus and microplate 2 are mated in a particular orientation. The use of complementary chamfers, or other locating features, in a microplate and sample transfer apparatus provides the non-limiting advantage of cross-referencing samples located in the microplate with the capillary tubes they contact and ultimately with the locations of samples on the surface of a substrate. Those skilled in the art will recognize that similar advantages can be realized using one or more locating features for a sample transfer apparatus that contacts other source sample arrays such as non-standard multi-well plates or collections of sample tubes.

A contact surface 40 of a sample transfer apparatus of the invention can be placed to position a plurality of outlet orifices and a substrate surface in sufficient proximity to transfer a droplet of liquid from the orifices to a substrate surface. An outlet orifice and substrate can be relatively close, for example, at most about 10, 20, 30, 40, 50, or 100 μm apart. Relatively close distances are useful for transferring small sample droplets, whereas further distances can be used to transfer larger drops. Alternatively an outlet orifice and substrate can be further apart including, for example, at most about 150, 200 or 250 μm apart.

A substrate useful in the invention can have a hydrophilic surface capable of holding an aqueous, polar or hydrophilic liquid. Exemplary, hydrophilic materials that can provide a hydrophilic surface include, without limitation, those set forth above in regard to capillary tube inner surfaces, or others such as nitrocellulose, paper products, or nylon. A substrate can also have a layer of hydrophilic material or a hydrophilic coating including, for example, those set forth above in regard to capillary tube inner surfaces. Alternatively, a substrate useful in the invention can have a hydrophobic surface capable of holding an apolar or hydrophobic liquid including, for example, those set forth above in regard to capillary tube inner surfaces.

In particular embodiments, a microscope slide or a substrate having a surface with substantially the same dimensions as the face of a standard microscope slide can be used in the invention. Accordingly, a substrate can have a surface area of about 7.5 cm by about 2.5 cm (about 3 inches by about 1 inch). A substrate can further have the thickness of a microscope slide which is about 1 mm (about 0.04 inch). An advantage of using substrates having standard microscope slide dimensions is that existing instrumentation useful for detecting or manipulating arrays of samples are configured to accept substrates of this size. Such instrumentation includes, for example, scanning based instruments sold by General Scanning, Molecular Dynamics, Gene Machine, Genetic Microsystems, Vysis, Axon, and Hewlett-Packard.

A surface 40 of a sample transfer apparatus that is placed to contact a substrate can further include vents 9 and 19. As shown in FIGS. 1 and 2, vents 9 and 19 are placed to maintain a fluid transfer system that is open to atmosphere at both ends when substrate 3 is in place. Thus, backpressure does not prevent movement of liquid samples from wells 7 to the surface of slide 3. Vents 9 and 19, as exemplified in FIG. 1, can have a dual function by also providing access to the side of the slide such that it can be lifted from the apparatus with relative ease. A vent or other feature can provide access around the periphery of a substrate that permits the substrate to be removed with fingers or a mechanical device. A feature included around or near the periphery of a substrate can be a slot, groove, handle or the like that allows manipulation of the substrate using robotic handling.

A substrate and support member can include complementary locating features similar to those set forth above in regard to microplates. Exemplary locating features can include, for example, asymmetric distribution of features around or near the perimeter of a substrate. Such locating features can provide non-limiting advantages of facilitating robotic handling and cross referencing of component orientations. Those skilled in the art will recognize that vents can be placed in other orientations to provide an open capillary system and need not provide a dual function of facilitating slide removal. Furthermore, a substrate can be removed, for example, by access mediated by features that are not necessarily vents. By way of example, a substrate and apparatus can be separated by attaching a suction device to the top of the substrate and pulling it off, whether or not a vent is present at the substrate perimeter.

A substrate useful in the invention can further include an array of attached chemicals or particles or both. As exemplified by FIG. 5, a substrate 30 used in the invention can include arrays of microspheres 31 attached to the surface of the substrate 30. Microspheres attached to a surface can further include, for example, attached chemicals such as bioactive agents. Substrates having arrays of microspheres can be made and used as described, for example, in U.S. patent application Ser. No. 09/931,271 (Publication No. US 2002/102578 A1). Other substrates having attached arrays that can be used in the invention are described, for example, in U.S. Pat. Nos. 5,445,934; 5, 384,261 and 5,571,639.

Exemplary chemicals that can be arrayed include, without limitation, polypeptides, polynucleotides such as DNA or RNA, polysaccharides or small organic molecules. As set forth in further detail below, chemicals arrayed on a substrate can be screened for one or more of a variety of activities including, for example, biological activity or industrial activity. Thus, a substrate can include a bioactive agent having, for example, an activity selected from ligand binding, enzyme inhibition, enzyme activation or hybridization to a complimentary polynucleotide. Other bioactive agents known in the art can be used in the invention including, for example, those described in U.S. patent application Ser. No. 09/931,271 (Publication No. US 2002/102578 A1). Exemplary arrays useful in the invention include those described in WO 95/25116; WO 95/35505; PCT US98/09163; U.S. Pat. Nos. 5,700,637, 5,807522, 6,406,845, 6,482,593 and 5,445,934. Chemicals having industrial activity that can be attached to a substrate include, for example, dyes, catalysts, pesticides, or industrially applicable bioactive agents. A chemical attached to a substrate can be a linker moiety that is reactive with a desired sample such that the sample can be covalently attached to the substrate following reaction with the linker moiety. Exemplary particles that can be arrayed include, without limitation, cells, organelles, liposomes, macromolecular complexes, polymer complexes or microspheres.

An array on a substrate and matrix of orifices in an apparatus of the invention can be configured such that a liquid sample is transferred from particular orifices to particular array locations when the substrate and apparatus are juxtaposed. An array on a substrate can have discrete sites separated by physical barriers such as walls, an expanse of space between arrayed samples, wells or depressions. Physical barriers can be integral to the substrate material or can be a separate material affixed to the surface such as a gasket of rubber or silicon. Discrete sites can also be created using chemical barriers such as a perimeter coating which prohibits passage of a fluid due to incompatibility of the coating and liquid. For example, an aqueous or polar liquid can be contained by a hydrophobic or apolar chemical barrier. Alternatively, a hydrophilic or polar barrier can be used to inhibit flow of a hydrophobic or apolar fluid.

Optionally, one or more separable components used in the invention can include a label identifying the component or a property thereof. A label useful in the invention can be one that is distinguishable by the human eye, a detector or both. A label can be one that is compatible with a laboratory information management system (LIMS) including, for example, an alphanumeric character or sequence; bar code; color code; magnetic, electrical or optical signature or other known format. Exemplary properties that can be identified by a label include, without limitation, sample composition, history of manufacture or use, instrument compatibility, protocols for use, or expiration date.

The invention further provides a method for transferring a plurality of samples from a microplate to a substrate. The method includes the step of providing a microplate having a plurality of samples; contacting simultaneously the plurality of samples with a matrix of inlet orifices of a plurality of separate capillary tubes, whereby the samples are passively drawn through the capillary tubes to a matrix of outlet orifices; contacting sample at the outlet orifices with a substrate, whereby the sample is transferred to the substrate, wherein the transfer area of the matrix of inlet orifices is larger than the transfer area of the matrix of outlet orifices.

A method of the invention can be used with an apparatus of the invention as set forth above. Although methods of the invention can readily be performed with an apparatus of the invention and will, in some instances, be described in the context of an apparatus of the invention for the sake of clarity, it will be understood that a method of the invention need not be performed with the apparatus exemplified herein. Conversely, use of an apparatus of the invention need not be limited to the methods exemplified below.

A method of the invention can be used to transfer an analyte or reagent from a reservoir to a substrate. Exemplary analytes and reagents that can be transferred in a method of the invention include, without limitation, an atom, organic or inorganic molecule, macromolecule, ion, compound, biological molecule, biologically active molecule, synthetic molecule, synthetic precursor, polymer, biological complex or cell. Thus, a method of the invention can be used to transfer a sample for environmental screening to detect pollutants; field screening for biological or chemical warfare agents; forensic screening; security screening; diagnostic screening to detect indicators of disease; prognostic screening to detect indicators of drug efficacy or individual response to treatment; or research screening to identify desired agents such as drug candidates, or industrially desirable agents. A method of the invention can also be used, for example, to transfer a reagent for synthesis of a compound, extraction, washing, sterilization or the like.

A sample transferred in a method of the invention can include a solvent or other liquid carrier that is compatible or otherwise appropriate for the analyte or reagent. A sample can additionally include one or more other agent that is useful for stabilizing, dissolving, activating, inhibiting or otherwise having a desired effect on the agent to be transferred. Those skilled in the art will know or be able to determine an appropriate sample composition to suit a particular agent to be transferred as well as a particular application in which it is to be used. In particular embodiments, a transferred sample can include solvents or reagents used for oligonulceotide or peptide synthesis, or for etching glass. For example, a sample can include a bioactive agent such as a nucleic acid or polypeptide along with a salt, pH buffer or detergent that stabilizes the bioactive agent or favors a particular activity of the bioactive agent that is to be evaluated. It will also be recognized that the invention can be used to transfer a solvent or solution, for example, to wash or hydrate a destination location and therefore need not include an agent that will be reacted or analyzed directly.

In a particular embodiment, a method of the invention can be used to transfer a sample derived from a human or other organism to a substrate. Such a sample can include one or more of the biological molecules set forth above and, if desired, a solvent or other component that is useful for storing or manipulating the sample. An exemplary application of the methods of the invention is transfer of a sample derived from a human or other organism to a substrate having a probe for a biological molecule in the sample. In particular, a method of the invention can be used to transfer a sample having one or more target nucleic acids to a substrate having an array of nucleic acid probes for a hybridization reaction. Similarly, a method of the invention can be used to transfer a sample containing one or more target polypeptides to a substrate having an array of probes such as receptors, antibodies or ligands of the polypeptides.

The invention can be used to transfer a sample containing a plurality of agents. Exemplary applications in which transfer of such a sample is desired include screening of multiple analytes and synthesis of compound libraries containing multiple product species. Furthermore, transfer of multiple samples each containing a plurality of agents can be used for multiplexed detection or synthesis. By way of example, multiplexed detection can be used to evaluate the sequences of a plurality of nucleic acids by contacting samples having mixtures of target nucleic acids with substrate surfaces that are derivatized with mixtures of probe nucleic acids as described for example in U.S. Pat. No. 6,429,027 and U.S. patent application Ser. No. 09/931,271 (Publication No. US 2002/102578 A1). Accordingly, a method of the invention can be used to transfer a plurality of nucleic acids for expression analysis, genotyping, or sequence analysis among others.

A sample used in the invention can contain any solvent or agent that is compatible with the surfaces with which it will come into contact. As set forth above, transfer of samples through capillary tubes can be influenced by hydrophilic or hydrophobic compatibility. Chemical compatibility can also be a factor in determining the composition of a sample and transfer apparatus that it will contact. Those skilled in the art will know or be able to determine appropriate sample and apparatus compositions to minimize dissolution or degradation of surfaces that come into contact with a sample.

A method of the invention can include a step of contacting a matrix of inlet orifices simultaneously with a plurality of source samples by placing an apparatus of the invention in juxtaposition with a multi-well plate or other set of sample reservoirs. Separate components used in the invention such as a support member, microplate, or substrate can be juxtaposed with each other by direct contact of the components with each other using, for example, contact surfaces as set forth above. However, juxtaposition can be achieved without contacting the parts themselves. The apparatus, source sample reservoirs or both can be manipulated manually or by an automated robotic system. Embodiments including source sample reservoirs and destination sample substrates having dimensions of standard microplates and microscope slides are well suited to robotic methods because many robotic systems are configured to manipulate objects of these dimensions.

A method of the invention can include a step of documenting manipulations carried out for apparatus components and the samples therein. In one embodiment, such documentation can include adding or modifying a label associated with a particular component. A label can be written by a printer, stamping device, magnetizing device or other device appropriate to the particular label. Accordingly, a sample history, instructions for sample manipulation, or both can be indicated by a label. A label can be subsequently read by an individual or detector depending upon the format of the label. An individual can read, for example, a label having an alphanumeric identifier or color coding scheme. The individual can then document past manipulations, determine an appropriate course of future manipulations to take for samples or both. Typically, the individual will interact with a computer having data storage capabilities and algorithms for determining and displaying a course of action based on the identity of samples indicated by the label. A detector that communicates directly with a computer in a laboratory information management system is convenient for efficient and rapid documentation and planning of sample manipulations especially in high throughput and ultra-high throughput applications of sample preparation, transfer or manipulation. Those skilled in the art will be able to implement a laboratory information management system for use in the methods of the invention using known principles and where convenient known systems such as those described in Avery et al., *Anal. Chem.* 72:57A–62A (2000).

In particular embodiments, a method of the invention can be used to transfer a plurality of samples simultaneously through capillary tubes to a substrate. For example, a plurality of samples can be transferred through capillaries of similar composition and geometry such that each sample is subjected to similar fluid resistance and makes initial contact with a substrate at substantially the same time. A plurality of samples that initially contact a substrate at substantially the same time will do so within about 5 seconds. Depending upon the particular application of the methods a plurality of samples can also initially contact a substrate within a narrower time range including, for example, within about 4, 3, 2 or 1 seconds.

A method of the invention can be used to transfer a predetermined volume of sample to a substrate. As set forth above, the volume of sample transferred in a method of the invention can be influenced by capillary tube diameter, length, inlet/outlet orifice height differential, composition, orifice diameter, or size and shape of an island formed around an outlet orifice. Accordingly, a method of the invention can be carried out under conditions where the amount of sample transferred to a substrate is, for example, at most about 25, 10, 5, 1, 0.8, 0.5, 0.3, 0.1, 0.05, 0.01, 0.005 or 0.001 μl of a sample. The amount of time in which a source sample is allowed to be in contact with a capillary tube or substrate can also influence the amount of sample transferred. Exemplary transfer times can be within about 60, 30, 15, 10, 5, 4, 3, 2, or 1 seconds. The amount of liquid sample transferred to a substrate in a method of the invention can also be influenced by the amount of time that a source sample is in contact with a transfer capillary tube or the amount of time that an outlet orifice is in contact with a destination location.

A method of the invention can be used to passively transfer a liquid sample from a source reservoir to a destination location absent a force applied to the liquid from a mechanical device such as a pump or vacuum. A sample transferred in a method of the invention absent a mechanically applied force can move through a tube under the influence of a natural force such as gravity or capillary action. Those skilled in the art will know or be able to determine appropriate properties for a capillary tube, such as those set forth above in regard to apparatus of the invention, in order to achieve passive transfer of a desired sample in a method of the invention.

Alternatively, a sample can be transferred in a method of the invention under the influence of a mechanically generated force. Any mechanically generated force that creates a pressure gradient across a capillary tube can be used. For example, a method of the invention can include a step of transferring a sample through a tube under the influence of a pump such as a syringe pump or pump used in liquid chromatography or other fluid handling systems. Another example of an applied force that can be used to move a fluid sample through a capillary tube of the invention is application of positive pressure to a source sample, for example, with a pressurized gas including, without limitation, argon, nitrogen, helium or other inert gas. Furthermore, a sample can be transferred through a capillary tube by the influence of a centrifugal force exerted on the sample. Thus, a method of the invention can include a step of applying a centrifugal force along a capillary tube and in a direction from a source sample location to a destination location. In addition, heat can be supplied to a source sample, for example, from a heating element or addition of a reactant that causes an exothermic reaction heating the sample. Those skilled in the art will know or be able to determine an appropriate pressure or suction device and compatible tubing to transfer liquid samples in accordance with the invention, for example, based on that which is known in the arts related to fluid handling.

A sample transfer apparatus can be re-used in a method of the invention. Accordingly, a method of the invention can include a step of removing residual sample from a capillary tube. Residual or unused sample volume can be retrieved from a capillary tube by blotting the inlet orifice on the bottom of a collection vessel including, for example, a microplate well. If desired, an apparatus of the invention can be washed with an appropriate solvent and, if further desired, dried to remove sample or wash solvent. An apparatus can also be sterilized, for example, by washing with an antibacterial solution or by autoclaving, so long as the material used in the apparatus is resistant to such treatment. An apparatus can remain intact or can be disassembled during manipulations for re-use. Furthermore, new components can be assembled to re-used parts. For example, capillary tubes can be removed from a support member following use and the used capillary tubes discarded and replaced with new ones prior to re-use of the apparatus. Thus, an apparatus of the invention can be re-used in whole or in part.

Those skilled in the art will recognize that an apparatus or method of the invention, although described above with respect to fluid transfer for purposes of illustration, can also be used to transfer a vapor or gas sample.

Throughout this application various publications, patents and patent applications have been referenced. The disclosure of these publications patents and patent applications in their entireties are hereby incorporated by reference in this application in order to more fully describe the state of the art to which this invention pertains.

The term "comprising" is intended herein to be open-ended, including not only the recited elements, but further encompassing any additional elements.

Although the invention has been described with reference to the examples provided above, it should be understood that various modifications can be made without departing from the invention. Accordingly, the invention is limited only by the claims.

What is claimed is:

1. A sample transfer apparatus for transferring samples from source wells to destination sample locations, comprising a plurality of separate capillary tubes each comprising an inlet and outlet orifice;

a support member orienting said inlet orifices as a matrix of inlet orifices and said plurality of outlet orifices as a matrix of outlet orifices; and a multi-well plate comprising a plurality of source wells, wherein said support member comprises a first contact surface for a supporting said multi-well plate, wherein said inlet orifices are directed to said wells and said outlet orifices are directed to destination sample locations, wherein said inlet orifices extend beyond said first contact surface into contact with the interiors of said wells, wherein said support member comprises a second contact surface spaced from and parallel to said first contact surface for holding a substrate having said destination sample locations, wherein said second contact surface is positioned to allow for a substrate placed thereon to be within 250 μm of said outlet orifices, and wherein the area of said matrix of inlet orifices is larger than the transfer area of said matrix of outlet orifices.

2. The sample transfer apparatus of claim 1, wherein said plurality of separate capillary tubes comprises at least 96 capillary tubes.

3. The sample transfer apparatus of claim 1, wherein said plurality of separate capillary tubes comprises at least 384 capillary tubes.

4. The sample transfer apparatus of claim 1, wherein said plurality of separate capillary tubes comprises at least 1536 capillary tubes.

5. The sample transfer apparatus of claim 1, wherein said matrix of inlet orifices is planar.

6. The sample transfer apparatus of claim 1, wherein said matrix of outlet orifices is planar.

7. The sample transfer apparatus of claim 1, wherein said matrix of inlet orifices has an area of 110 $cm^2$.

8. The sample transfer apparatus of claim 1, wherein adjacent inlet orifices are at most 9 mm apart.

9. The sample transfer apparatus of claim 1, wherein said capillary tubes have a cross-sectional area of 1 $mm^2$.

10. The sample transfer apparatus of claim 1, wherein said capillary tubes have at most two openings.

11. The sample transfer apparatus of claim 1, wherein said outlet orifices have a cross-sectional area of 1 $mm^2$.

12. The sample transfer apparatus of claim 1, wherein said capillary tube comprises a hydrophilic interior surface.

13. The sample transfer apparatus of claim 1, wherein said capillary tube comprises a hydrophobic interior surface.

14. The sample transfer apparatus of claim 1, wherein said multi-well plate is removably connected to said first contact surface.

15. The sample transfer apparatus of claim 1, wherein a substrate is removably connected to said second contact surface.

16. The sample transfer apparatus of claim 15, wherein said substrate further comprises an array of beads.

17. The sample transfer apparatus of claim 1, wherein said support member further includes a plurality of wells in contact with said inlet orifices.

18. The sample transfer apparatus of claim 1, wherein said matrix of inlet orifices is arranged in a rectangular grid.

19. A sample transfer apparatus for transferring samples from source wells to destination sample locations, comprising a plurality of separate capillary tubes each comprising an inlet and outlet orifice; and a support member orienting said inlet orifices as a planar matrix of inlet orifices and said plurality of outlet orifices as a planar matrix of outlet orifices, wherein said planar matrix of inlet orifices is substantially parallel to said planar matrix of outlet orifices, a multi-well plate comprising a plurality of source wells, wherein said support member comprises a first contact surface for supporting said multi-well plate, wherein said inlet orifices extend beyond said first contact surface into contact with the interiors of a plurality of said wells, wherein said inlet orifices and said outlet orifices are pointed in opposite directions, wherein said support member comprises a second contact surface spaced from and parallel to said first contact surface for holding a substrate having said destination sample locations, wherein said second contact surface is positioned to allow for a substrate placed thereon to be within 250 μm of said outlet orifices, and wherein the area of said matrix of inlet orifices is larger than the transfer area of said matrix of outlet orifices.

* * * * *